US006279245B1

(12) United States Patent
Johnsen

(10) Patent No.: US 6,279,245 B1
(45) Date of Patent: Aug. 28, 2001

(54) BALL CONTROLLER FOR CHECKING THE DIAMETER OF A GOLF BALL

(76) Inventor: Erling Johnsen, Hopsnesvei 79, N-5040 Paradis (NO)

( * ) Notice: Subject to any disclaimer, the term of this patent is extended or adjusted under 35 U.S.C. 154(b) by 0 days.

(21) Appl. No.: 09/194,133

(22) PCT Filed: Apr. 16, 1997

(86) PCT No.: PCT/NO97/00098

§ 371 Date: Nov. 30, 1998

§ 102(e) Date: Nov. 30, 1998

(87) PCT Pub. No.: WO97/45171

PCT Pub. Date: Dec. 4, 1997

(30) Foreign Application Priority Data

May 30, 1996 (NO) ........................................ 962194

(51) Int. Cl.[7] .............................. A63B 47/00; G01B 3/34; G01B 5/00
(52) U.S. Cl. ............................................ 33/555.2; 473/180
(58) Field of Search ............................. 33/555.1, 555.2, 33/555.4; 473/179, 180; D10/61, 64

(56) References Cited

U.S. PATENT DOCUMENTS

| 3,209,463 | * | 10/1965 | Schorr | 33/555.2 |
|---|---|---|---|---|
| 3,310,879 | * | 3/1967 | Brzezinski | 33/555.2 |
| 3,512,262 | * | 5/1970 | Smyk | 33/555.2 |
| 3,548,506 | * | 12/1970 | Harrington | 33/555.2 |
| 3,765,097 | * | 10/1973 | Woelich | 33/555.2 |
| 3,797,123 | | 3/1974 | Fraley . | |
| 3,828,442 | * | 8/1974 | Bernard | 33/555.2 |
| 4,385,447 | * | 5/1983 | Bennett | 33/501 |
| 4,528,759 | | 7/1985 | Joyce et al. . | |
| 4,906,006 | * | 3/1990 | Sigunick | 473/185 |
| 4,928,417 | * | 5/1990 | Boudreau | 40/660 |
| 5,401,019 | * | 3/1995 | Wissman et al. | 473/286 |
| 5,535,636 | * | 7/1996 | Myers | 33/555.2 |

FOREIGN PATENT DOCUMENTS

| 551045 | * | 7/1993 | (EP) | 33/555.1 |
|---|---|---|---|---|
| 2269671 | | 2/1994 | (GB) . | |

* cited by examiner

*Primary Examiner*—Christopher W. Fulton
(74) *Attorney, Agent, or Firm*—Francis C. Hand, Esq.; Carella, Byrne, Bain, Cecchi, Stewart & Olstein

(57) ABSTRACT

A ball controller (10) is in the form of a rigid mat having a central cavity (12) for the reception of a golf ball (11) for checking the diameter of a golf ball (11), the ball controller (10) having sectionally (13, 14, 15) differing wall thicknesses (a, b, c) in the radial direction of the controller (10) and preferably having an optimal thickness in a radially innermost, annular portion (15) around the cavity (12). The cavity (12) has a cylindrical inner face (14a) having an axial dimension (1) of 3 mm minimum.

20 Claims, 2 Drawing Sheets

BALL CONTROLLER FOR CHECKING THE DIAMETER OF A GOLF BALL

Present invention relates to a ball controller or so-called calibrator in the form of a rigid, annular mat having a central cavity for reception of a golf ball for checking the diameter of a golf ball, where the cavity has a cylindrical inner face having an axial dimension.

The game of golf has been practiced for over 500 years. No other sport is so dependent upon the characteristics of the ball as the sport of golf is. In the game of golf the point of contact between golf club and golf ball is decisive for the general movements or pattern of movement of the golf ball, since the golf ball during rolling on the ground as well as during flight in the air is most often subjected to larger or lesser spin, which affects the pattern of movement of the golf ball. The golfer can by trained skill plan and control the movement or pattern of movement of the ball in an accurate manner relative to the ground and by the flight of the ball over the ground. However in order to achieve the best possible chance for control it is of decisive importance that the golf ball exhibits the correct shape.

It is usual that golf balls are made with different compression characteristics, among them greater or lesser rigidity, various material qualities, etc.

In order to obtain optimal results of each golf stroke it is of decisive importance that the golf ball has at the start the correct spherical shape, that is to say that the golf ball does not have or has not been given an unround shape by preceding blows of the club or impacts against hard ground. It is of decisive importance that the spherical shape is intact in order that the ball shall be able to move in the intended manner both when it is to roll on the ground and when it is to move in flight over the ground.

As is known golf balls are per se relatively elastic, so that they are intermittently deformed at the moment of hitting or by impact against objects in nature from a spherical shape to an egg-like shape. Often during use the golf ball can be permanently deformed to a more or less unround form. Alternatively certain golf balls can already at the time of purchase have an unround form. However it can be difficult for the user, that is to say the golfer, to determine visually how far the golf ball has a greater or smaller deviation from the intended correct spherical shape.

Clear rules and exact specifications exist for the design of golf balls:

Its weight shall be a maximum of 45.93 grams.

Its size shall not be less than 42.67 mm.

It shall have a spherical symmetry.

Its speed of departure shall be a maximum of 76.2 m/second.

The total length of the flight of the ball shall be 256 m+6%.

The outer surface of the golf ball is provided with a so-called dimple design. This design is formed by a large number (300–500 pieces) of tightly coincident, spherically convex surface portions which can be arranged in various detail designs and with more or less deep and shallow depressions. The dimple design has a decisive significance for the flight of the golf ball. In addition the dimple design provides the chance for the intended correct contact between ball and club during different club hits. In addition to the said spin movement in the flight of the golf ball through the air, the intended back spin movement can also be achieved by contact with the ground.

When a golf club strikes a golf ball for example with a speed of about 160 km/hour, this constitutes a significant force of impact (of the order of magnitude of 1 ton) at the moment of the strike. This force of impact involves the ball being compressed and receiving a delivery speed of about 260 km/hour. The force of impact gives the ball so-called "back spin" when it is pressed against the air. As a result of the ball spinning backwards during the flight relative to the direction of movement through the air, the dimple design and the associated surface depressions involve the air passing rapidly on the upper side of the ball. This involves the creation on the upper side of the ball of an air cushion with a pressure reduction, while on the under side of the ball a pressure build up is created. On the under side the air is met which the ball shall pass and the air which the dimple design draws with itself during the back spin. Consequently there is a dilution of the air on the upper side and a damming up of air on the under side, something which involves the ball being lifted.

The importance of the symmetrical depressions on the outer surface of the golf ball is clearly illustrated in that a ball with a dimple design can normally be hit 250 m, while a ball without the dimple design can only be hit about 100 m.

When one knows by experience that the depressions can vary from almost plane field to spherical skullcap field with a height of 0.3–0.4 mm it will be clearly evident from the above that even minor deviations in the spherical shape of a golf ball can have big consequences on the flight of the ball in practice it is found that the ball during flight by an unround ball is easily exposed to unintended or uncontrollable "screw" and thereby change direction in part to a significant degree.

An unroundness will also act negatively on the intended rolling movement of the golf ball along the ground. The golfer thereby has a missing control over the intended, that is to say controlled movements of the golf ball. An unroundness can in addition act negatively on the flight direction of the ball sideways or the direction of movement sideways along the ground, if the head of the club strikes an unround ball portion. That is to say the ball can be involved in an intended screw movement in a horizontal direction.

In many cases the golfer can have a certain impression of the condition of the ball by visual inspection of the surface of the ball, for example how far the spherical surface portions are worn down or are damaged/-deformed in another way, but the spherical convex surface portions of the golf ball can also make it difficult visually to determine sufficiently surely how far the golf ball exhibits the intended accurate spherical shape.

It is clearly indicated that if a golf ball is unround it will have considerable negative effects for the golfer, and therefore it is important to be able to sort out balls which for one or another reason have become more or less unround. Hitherto a golfer has not had a sufficiently accurate tool which has been able to separate the unround balls with sufficient reliability and accuracy.

According to the rules the golf ball shall not be less than 42.67 mm in diameter. Experience shows that manufacturers follow the rule with deviations which only turns on some few hundred parts of a millimetre. A measuring tool which is able to separate unround balls from round must be able to show faults which are larger than 0.15 mm. That is to say that the diameter of the hole which the golf ball is to be tested in ought to be 42.82 mm +/−0.01 mm and be guaranteed absolutely 100% round.

A type of ball controller has been in use which is in the form of a plane metal mat with associated central cavity, which is adapted to receive the golf ball, which is to be inspected with respect to dimensions, unroundness, etc. There is undertaken then a turning of the ball in different peripheral directions, while it is received in the central cavity of the ball controller. In order to ensure that the ball is inspected in a position, which is concentric to the cavity of the ball controller, a ball support member is employed arranged on the under side of the ball controller. This involves extra complications in manufacture and in addition the ball controller becomes unnecessarily demanding of space.

An important requirement for the measuring tool is that it must be readily available during the golf game. At any time during the play the player must be able to inspect and consider whether the ball he is to strike retains its dimensions. The measuring tool must therefore for example be able to be readily fetched up from the pocket of the trousers. The measuring tool must be solid and stable so that normal use of the tool does not reduce its lasting accuracy.

According to U.S. Pat. No. 5,401,019 an "all-in-one tool" is shown, comprising inter alia an arrangement for checking the roundness and diameter of the golf ball. A ball controller is illustrated with substantially the same wall thickness over the whole radial direction of the ball controller and with a limited, that is to say relatively narrow cylindrical inner face in the central cavity of the ball controller. By means of a turn button which can be adjusted between aligning and inwardly projecting positions relative to the cylindrical inner face, the roundness and diameter of the golf ball can be sectionally controlled. However accurate central positioning of the central plane of the golf ball relative to the limited cylindrical inner face is required in order to be able to achieve accurate measuring results.

In U.S. Pat. No. 4,528,759 is illustrated a cylindrical tubular ball controller made of silicon carbide. The ball controller has a restricted radial extension including a number of mutually parallel annular ribs extending radially outwards at its external periphery. The internal tube face, which provides the ball scanning face, is covered with additionally machined resin.

In GB 2 269 671 is illustrated a ball controller made of plastic comprising a plate of mainly rectangular form. At one end of the plate a tubular ball scanner extends transversely of the plate and at the internal face thereof is provided a ball scanning face.

The above stated embodiments of prior art have a lack of stability during use which may involve inaccurate scanning results. More specified the ball controller of prior art is suggested to be made of material that may be subjected to unintended wear and tear during use. In addition the construction of the ball controllers of prior art may result in shape deformation caused by varying temperature condition. The construction of the ball controllers of prior art is to some extent complicated to grip and hold during scanning of the golf ball in the open hand of the user.

With the present invention the aim is to be able to produce a ball controller, which exhibits optimal possibilities for accurate control of the shape, dimensions etc. of the golf ball by the help of simple means. Particularly the aim is that it shall be simple to handle, that is to say which can show the results of measuring by a simple rotation of the golf ball relative to the ball controller for example by continuous rotation of the golf ball in the cylindrical inner face of the ball controller during support of the golf ball in the open hand of the user. In addition the objective is that the ball controller shall be able to be received in a manner requiring little space for example in the user's pocket, and which in addition is relatively light in weight and relatively simple to produce.

More specifically the objective according to the invention is to combine various favourable practical features in the ball controller by means of special shaping and dimensioning of the ball controller together with a special production technique. The aim is to achieve a) practical use characteristics, such as simple form, low weight and low space requirements, b) stable high degree of accuracy during practical measuring of the roundness and dimensions of the ball and c) the possibility for manufacture of the ball controller in a low-priced manner.

The ball controller is characterised in that the ball controller has an annular shape with a substantially H-shaped cross-section, including three sectionally differing wall thicknesses in the radial direction of the controller, that the ball controller has an optimal or largest wall thickness in a radially innermost, annular portion around the cavity and a smallest wall thickness in a central, annular portion and an average wall thickness in a radially outer, annular reinforcing portion, and that the axial dimension of the cylindrical inner face of the cavity corresponds to the largest wall thickness or is at least greater than the smallest wall thickness, that is to say constitutes a minimum of 3 mm and preferably 5–6 mm.

Since the ball controller has a sectionally differing wall thickness in the radial direction of the controller the necessary rigidity of the ball controller is ensured.

By employing an optimal or a largest mat thickness just at the cavity of the mat there is achieved the possibility for moderate wall thickness and weight-saving following from this in remaining mat portions, while nevertheless relatively great strength and rigidity can be obtained in the mat portion which surrounds and embraces the cylindrical support face, which is to receive the golf ball.

Since the axial dimension of the cylindrical inner face of the cavity corresponds to the largest wall thickness or is at least greater than the smallest wall thickness, that is to say constitutes a minimum of 3 mm and preferably a minimum of 5 mm, a possibility for axial movement of the golf ball can for example be permitted at the same time as it is rotated about the axis of the cylindrical inner face, without thereby negatively affecting the result measured.

The said optimal or largest mat thickness radially innermost at the support face of the cavity consequently permits the golf ball during measurement of shape (possibly unroundness) and dimensions relative to the support face, to be movable to a certain extent axially along the support face—without this needing to have an affect on the accurately measured result intended. This means that the ball controller according to the invention will be specifically useable in practice, with the possibility for a certain displacement of the ball in a more or less chance manner axially along the support face, without thereby affecting the measured result. On measuring shape and especially possible unroundness it is of interest to permit the golf ball to rotate in different planes relative to the cylindrical support surface. More specifically the center of the golf ball, during the measurement in the ball controller, can be allowed to be axially displaced at least 1–3 mm to opposite sides relative to a transversely extending (radial) central plane through the support face. In practice this means that one is not dependent on any extra support member in addition to the mat itself. In practice therefore the ball controller can be designed in a space-saving manner without affecting the results measured.

As the ball controller has a substantially H-shaped cross-section at its radially innermost portion this means that corresponding reinforcing features can be obtained. In addition a relatively large axial dimension of the support surface can be obtained with a continuous cylindrical support face along the inwardly facing leg portion of the whole H shape. Furthermore in addition the measurement can be undertaken from an arbitrary end of the cavity as required. A mat made with the afore-mentioned design can be stamped (cold hammered) out of plate material in a ready manner.

It is preferred that the H-shaped ball controller in a portion between the radially innermost portion and a radially outermost portion has an annular transition portion having a low wall thickness. This portion can form a carrier for receiving information, such as, an annular strip with printed text, advertising or the like. By sticking in the annular strip on said annular portion the advertising text can be applied on the mat without coming into conflict with the calibration face, at the same time as the strip lies protected in the annular portion.

It is possible according to the invention to undertake the designing of the mat from a plane mat blank by cold hammering, since the wall thickness is compressed locally. The result is that a change in the molecular structure of the material of the annular transition portion is obtained, so that an extra permanent reinforcement of the portion of the mat lying radially within and radially outside is achieved, which has a greater wall thickness. A calibration of the cylindrical measuring surface of the cavity having the intended accurate diameter, is undertaken after said cold hammering is accomplished. Consequently there is obtained a special flexurally rigid mat, which can ensure that the user obtains, lasting, accurate measuring criteria.

If a simple displacement of the golf ball is effected forwards and backwards in an axial direction via the cavity the diameter of the ball can only receive inspection in a restricted peripheral sector. Therefore it is important that said ball sector can be turned in addition relative to the cylindrical inner wall and that the turning takes place with the center of the golf ball arranged within the axial dimension of the inner wall. This can be readily ensured with the solution according to the invention, especially in cases where the calibration face has a height dimension of an order of magnitude of 4–5 mm.

In order to be able to ensure correct control of the golf ball under various conditions, particularly during different temperature conditions, it is important that the material of the golf ball controller is dimensionally stable, so that the occurrence of substantial dimensional changes in the ball controller are avoided on changes of temperature and especially that deformation to an unround shape of the cavity of the ball controller is prevented.

In this connection it is preferred that the control member is formed by an annular member reinforcing per se having a symmetrical annular cross-section, made of a dimensionally stable material, such as metal, especially rust-free steel or tempered rust-free steel. In a practically preferred solution brass or similar special alloys are employed as starting materials, since one can then ensure the least possible weight, but simultaneously optimal rigidity and resistance to wear.

Further features of the present invention will be evident from the following description having regard to the accompanying drawings, in which.

Figure 1:
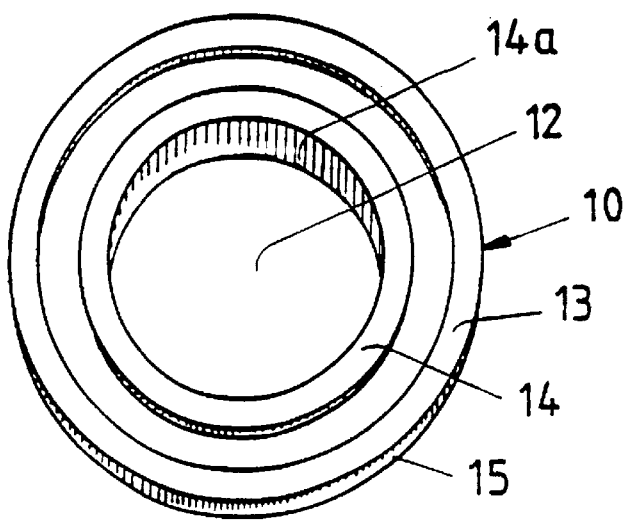
FIG. 1 shows in perspective a ball controller in the form of an annular member according to a first construction.

In FIG. 1 a first construction of a ball controller 10 or so-called calibrator is shown, for controlling the dimensions and shape of a golf ball 11 (see FIG. 4) in a cavity 12 centrally of the ball controller 10.

The ball controller 10 is made in the form of an annular flat-shaped one piece rigid body. An annular relatively thick-walled outer peripheral portion 13 is shown for reinforcing the body at its outer periphery and an annular, more thick-walled inner peripheral portion 14, which surrounds a circular aperture 12 centrally of the ball controller 10. Within an intermediate, annular intermediate portion 15 has at least a wall thickness between the annular portions 13,14. The dimension a (2 mm) shows the wall thickness of the outer peripheral portion 13, the dimension b (1.5 mm) shows the wall thickness of the intermediate portion 15 and the dimension c (6 mm) shows the wall thickness of the inner peripheral portion 14.

Figure 2:
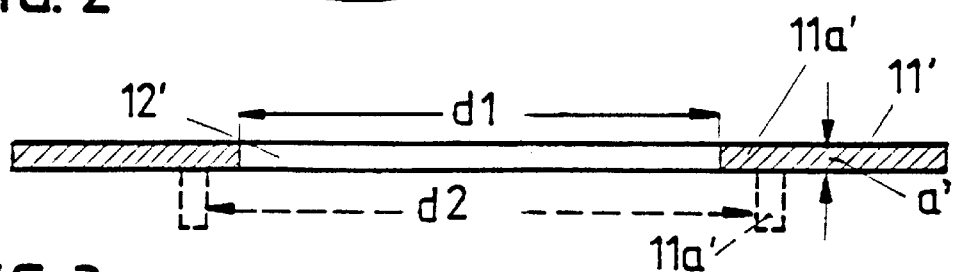
FIG. 2 shows in cross-section, schematically indicated, a blank for the ball controller according to the invention in a first processing step.
Figure 3:
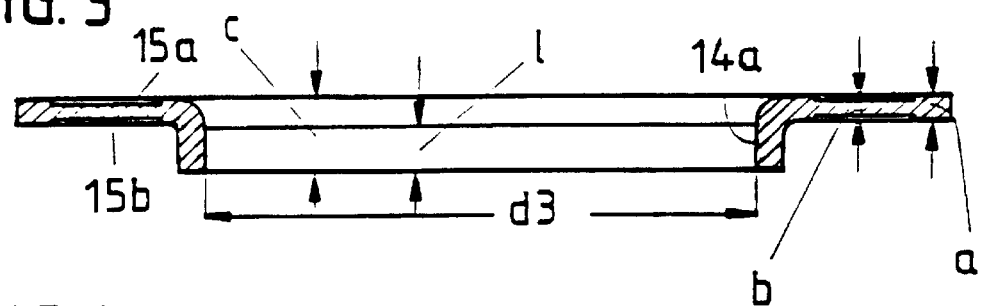
FIG. 3 shows the ball controller in cross-section in a second processing step.

In the illustrated embodiment processing steps are employed, such as made clear in FIG. 2 and 3. An annular blank 11' of steel is stamped out as is shown in FIG. 2 with a wall thickness a' of 2 mm and an inner diameter d1 for a cavity 12' of about 30 mm.

By broken lines a drawing (cold hammering) is shown of the radially innermost portion 11*a*' of the blank 11' to an angled annular contour, that is to say the blank is designed with an inner portion 11*a*" shown L-shaped in cross-section. By means of the cold hammering/drawing the molecular structure of the inner portion 11*a*' is affected, so that an extra reinforced, relatively shape-stable inner portion 11*a*" is obtained. The cavity 12" as shown at the inner portion 11*a*" has an inner diameter d2 of approximately 42.60 mm.

In FIG. 3 the ball con-roller 10 is shown in a ready made form after an outer surface stamping (cold hammering) of the annular intermediate portion 15 is effected, as is indicated by the annular cavities 15*a* and 15*b*. In the cavity 15*a* advertising or other information can be glued in via an annular adhesive-carrying strip (in a manner not shown further). In practice it has been found that for processing reasons it is difficult to effect stamping of text and the like in the body by for example cold hammering, since the calibration face of the body is found to be sensitive to any extra stamping of the body. Within the intermediate portion an extra reinforced, relatively shape-stable intermediate portion 15 can be obtained by means of the compressed material and the molecular structure changed thereby. Thereafter the inner portion 14 is calibrated along a cylindrical inner face 14*a* having an inner diameter d3 equal to 42.82 mm+/−0.015 mm which corresponds to an ideal golf ball diameter d4 of 42.79 mm and which gives a measure of fit of 0.03 mm. This measure of fit will be sufficient to permit free turning of the golf ball 11 in the cavity 12 by a completely round golf ball. The measure of fit will on the other hand reveal the unroundness of the controlled golf ball in the diameter dimension, which has a deviation greater or smaller than 0.03 mm. The cylindrical inner face 14*a* is shown with an axial length 1 equal to 3 mm, while the ball controller 10 is shown with a wall thickness c of 6 mm. As required however the length 1 can be increased to for example 4–5 mm. A wall thickness a is shown for the outer peripheral portion 13 of 2 mm and a wall thickness b for the intermediate portion 15 of 1.5 mm. At the ball entry portion of the cavity 12 a convexly rounded transition portion 16 is shown for facilitating the introduction of the golf ball in the cylindrical inner face 14*a* of the cavity 16.

Figure 4:
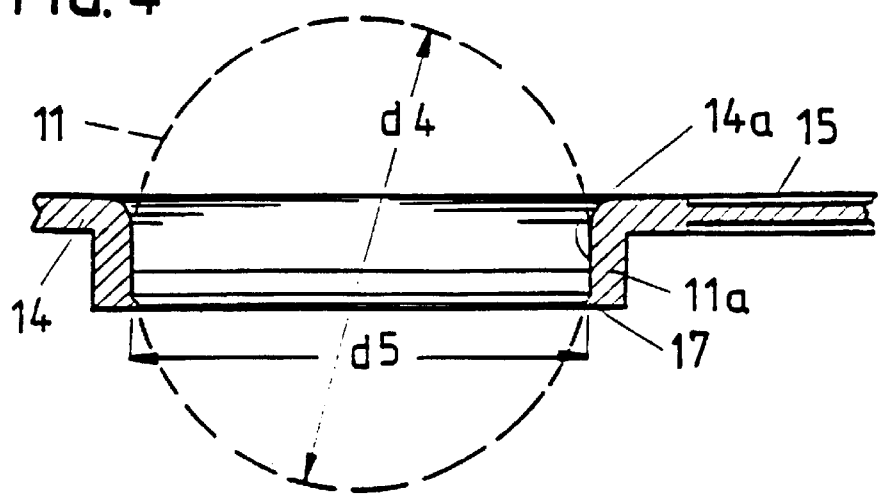
FIG. 4 shows a golf ball in cross-section received in a ball controller according to an alternative construction.

In FIG. 4 the ball controller 12 is illustrated in an alternative embodiment, in which a golf ball 11 is indicated in broken lines received in the cavity 12. The sole deviation from the construction according to FIG. 3 is that during the calibration of the inner face 14*a* a bead 17 is left behind, which normally can form stops for the golf ball 11 in its control position in the ball controller 10. An inner diameter d5 for the bead is shown equal to 42.73 mm. If the golf ball can be introduced with a turning fit in the cavity 12 but is stopped by the bead 17, the dimensions of the golf ball lie within an established norm by the ball controller. In practice it is obviously possible to establish the dimensions differently than indicated herein, all according to which diameter norm has to be provided for in the individual instance. For example the diameter measurement of the ball controller can be in accordance with the diameter norm of the golf ball producer. In this respect the golf ball controller can in connection with advertising or like information refer to a specific golf ball producer.

Figure 5:
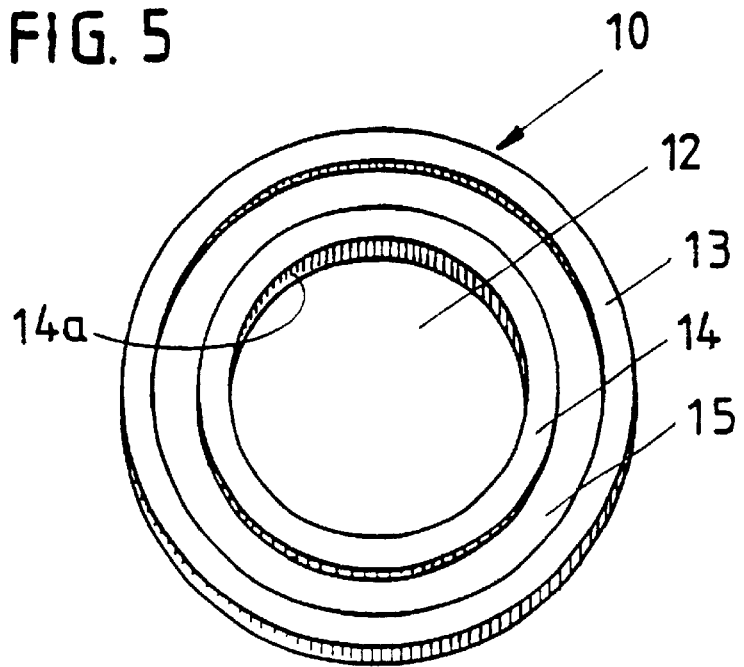
FIG. 5 shows a ball controller in perspective in the form of an annular member according to another construction.
Figure 6:
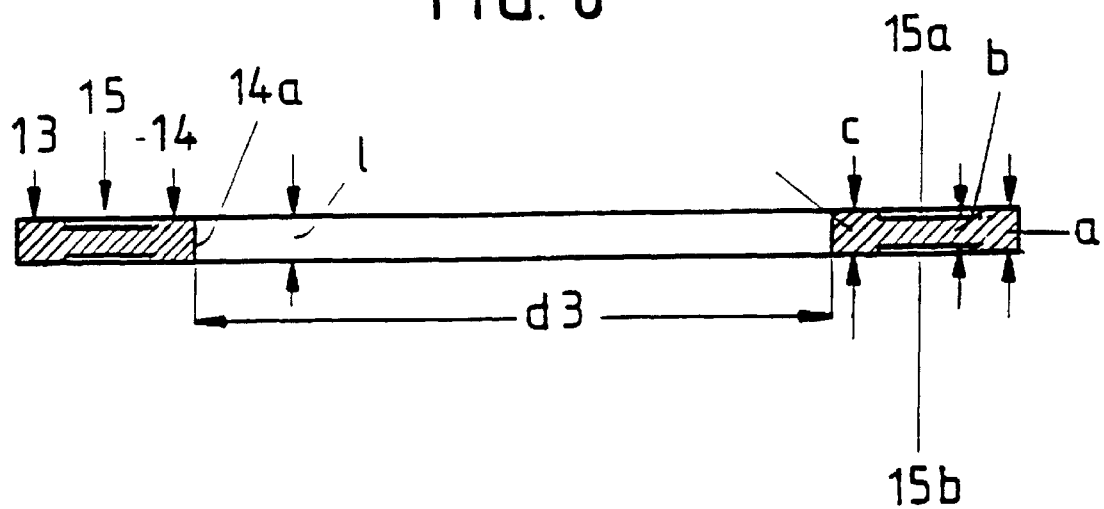
FIG. 6 shows a ball controller in cross-section according to FIG. 5.

In FIG. 5 and 6 a ball controller 10 is shown in a third embodiment which is made by a manufacturing process differing from that which is illustrated in FIG. 2 according to the first embodiment. By way of introduction a blank, in the form of an annular mat of steel, is made having a wall thickness a equal to 3 mm. In a corresponding manner as explained with reference to FIG. 3 an outer face stamping (cold hammering) is effected of an annular intermediate portion 15, such as indicated with annular cavities 15a and 15b. In the cavities 15 advertising or other information can be stamped (in a manner not shown further), while in the cavity 15b current information can be stamped (in a manner not shown further) in connection with the measurement dimensions of the ball controller 10, and the like. In the intermediate portion an extra reinforced, relatively shape-stable intermediate portion 15 is obtained by means of the compressed material and the molecular structure changed thereby. Thereafter the inner portion 14 is calibrated along a cylindrical inner face 14a having an inner diameter d3 equal to 42.70 mm which corresponds to an ideal golf diameter of 42.67 mm and which gives a measure of fit of 0.03 mm. The cylindrical inner face 14a is shown with an axial length 1 equal to 3 mm, while the ball controller 10 is shown with an equivalent wall thickness c of 3 mm. As required however the length 1 can be increased to for example 4 mm by correspondingly increasing the wall thickness of the blank 10' to 4 mm.

Without being shown specifically herein, it is apparent that also in the third embodiment according to FIG. 5 and 6 an equivalent bead portion as shown by the bead 17 in FIG. 4 can be designed during calibration of the cylindrical inner face 14a to the desired inner diameter d2.

In the illustrated embodiments only annular ball controllers are shown, but in practice other current designs can be employed for example in the form of rectangular plates which have a considerably larger length and breadth dimension than the outer peripheral diameters of the ball controllers illustrated herein. The ball controllers illustrated herein can consequently include larger mats or plates, without examples being shown herein.

Alternatively, without being illustrated specifically herein, a ball controller 10, as shown herein, can be fastened in position with suitable means to a larger mat of plastic or other suitable material, for example in connection with a club membership mat or the like.

What is claimed is:

1. A ball calibrator comprising a one piece rigid flat-shaped body having an aperture of circular shape for receiving a ball therein, said body having an enlarged inner peripheral portion defining and reinforcing said aperture, an enlarged outer peripheral portion and a recessed annular portion between said peripheral portions for receiving information.

2. A ball calibrator as set forth in claim 1 wherein said inner peripheral portion has a minimum thickness of 3 mm and said recessed annular portion has a minimum thickness of 1.5 mm.

3. A ball calibrator as set forth in claim 1 wherein said inner peripheral portion has a minimum thickness of from 5 to 6 mm.

4. A ball calibrator as set forth in claim 1 wherein said inner peripheral portion has a thickness greater than the thickness of said outer peripheral portion.

5. A ball calibrator as set forth in claim 1 wherein said inner peripheral portion has a thickness equal to the thickness of said outer peripheral portion.

6. A ball calibrator as set forth in claim 1 wherein said inner peripheral portion has a minimum thickness of 3 mm.

7. A ball calibrator as set forth in claim 1 wherein said body includes a radially inwardly directed bead on said inner peripheral portion to provide a stop for a ball received in said aperture.

8. A ball calibrator as set forth in claim 1 wherein one of said peripheral portions and said recessed portion define an L-shaped cross-sectional shape.

9. A ball calibrator as set forth in claim 1 wherein said peripheral portions and said recessed portion define an H-shaped cross-section shape.

10. A ball calibrator as set forth in claim 1 wherein said body has a symmetrical annular cross-section.

11. A golf ball calibrator comprising an annular flat-shaped one piece rigid body having an inner peripheral portion defining a circular aperture for receiving a golf ball therein, an outer peripheral portion and a recessed annular portion between said peripheral portions.

12. A golf ball calibrator as set forth in claim 11 wherein said inner peripheral portion as a minimum thickness of 3 mm and said recessed annular portion has a minimum thickness of 1.5 mm.

13. A ball calibrator as set forth in claim 11 wherein said inner peripheral portion has a minimum thickness of from 5 to 6 mm.

14. A golf ball calibrator as set forth in claim 11 wherein said body includes a radially inwardly directed bead on said inner peripheral portion to provide a stop for a golf ball received in said aperture.

15. A golf ball calibrator as set forth in claim 11 wherein one of said peripheral portions and said recessed portion define an L-shaped cross-sectional shape.

16. A ball calibrator as set forth in claim 11 wherein said body has a symmetrical annular cross-section.

17. A golf ball calibrator comprising
an annular flat-shaped one piece rigid body having
a cylindrical support face defining a circular aperture for rotatably receiving a golf ball and having a longitudinal length of at least 3 millimeters for calibrating the spherical shape of the golf ball upon rotation therein,
an outer peripheral portion, and
a recessed annular portion between said cylindrical support face and said outer peripheral portion, said annular portion defining a flat mat for rigidifying said support face and for receiving information thereon.

18. A golf ball calibrator as set forth in claim 17 wherein said support face and said recessed annular portion define an L-shaped cross-sectional shape and wherein said support face has a length of 5 to 6 millimeters.

19. A golf ball calibrator as set forth in claim 17 wherein said body includes a radially inwardly directed bead on one end of said support surface to provide a stop for a golf ball received in said aperture.

20. A golf ball calibrator as set forth in claim 17 wherein said support face, said outer peripheral portion and said recessed portion define an H-shaped cross-section shape and said body has a symmetrical annular cross-section.

* * * * *